US005509186A

United States Patent [19]

Straut

[11] Patent Number: 5,509,186

[45] Date of Patent: Apr. 23, 1996

[54] BEARING PUSHER

[76] Inventor: Nelson F. Straut, 515 N. Hairston Rd., Stone Mountain, Ga. 30083

[21] Appl. No.: 348,449

[22] Filed: Dec. 2, 1994

[51] Int. Cl.[6] .............................. B23P 19/04

[52] U.S. Cl. .............................. 29/256

[58] Field of Search .............................. 29/256, 263, 266, 29/258, 239, 238, 237, 235

[56] References Cited

U.S. PATENT DOCUMENTS

| | | | |
|---|---|---|---|
| 889,315 | 6/1908 | Kenyon | 29/256 |
| 1,310,806 | 7/1919 | Rollins | 29/256 |
| 1,587,689 | 6/1926 | Weiss et al. | 29/256 |
| 1,930,690 | 10/1933 | Oelkers | 29/256 |
| 3,174,218 | 3/1965 | McConaha | 29/256 |
| 4,027,373 | 6/1977 | Kwast et al. | 29/256 |
| 4,287,653 | 9/1981 | Bloch | 29/256 |
| 4,304,036 | 12/1981 | Blomgren | 29/256 |

*Primary Examiner*—Robert C. Watson

*Attorney, Agent, or Firm*—James B. Middleton

[57] ABSTRACT

A bearing pusher to remove a bearing from a shaft has a split anchor block that can be placed over the shaft at any point desired. The split block is then fixed together; and, a plurality of set screws engage the shaft or, preferably, enter a groove in the shaft to hold the anchor block in place. A split pusher block can be placed over the shaft between the anchor block and the bearing, and the parts fixed together. Screws pass through threaded holes in the anchor block and engage sockets in the pusher block, so that rotation of the screws causes motion of the pusher block longitudinally along the shaft.

4 Claims, 1 Drawing Sheet

BEARING PUSHER

BACKGROUND OF THE INVENTION

1. Field of the Invention

This invention relates generally to bearing removal means, and is more particularly concerned with a shaft-mounted apparatus for pushing a bearing or the like off the shaft.

2. Discussion of the Prior Art

In removing a bearing or the like from a shaft, one of the most common techniques is to utilize a bearing puller wherein a spindle engages the end of the shaft, and hooked fingers engage the bearing. A screw then urges the fingers rearwardly to pull the bearing off the shaft.

There are some bearings in which the end of the shaft is not accessible for use of the conventional bearing puller. One such bearing is a front wheel bearing of a front-wheel drive automobile. Such a bearing is splined to a shaft, and a hub surrounds the bearing and mounts the stub shaft to carry a wheel. Since the end of the shaft mounting the bearing is not accessible, the conventional bearing puller is not usable. The conventional method for removing such bearings is to drive the bearing off the shaft with hammer blows. It is well known that one ought not to hammer on a bearing; but, there has been no other means devised for removal of the bearings. Thus, even manufacturer-trained mechanics hammer on the bearing to remove it from the shaft.

SUMMARY OF THE INVENTION

The present invention provides a shaft-mounted pusher for gently urging a bearing off a shaft. An anchor block is split to be placeable on a shaft at any position desired, and a pusher block is also split to be placeable on a shaft adjacent to the anchor block. The pusher block is placed adjacent to the bearing to be removed, and pushing members threadedly carried by the anchor block engage the pusher block and move it to move the bearing.

The anchor block includes means for locking the anchor block with respect to the shaft, while the pusher block is freely movable along the shaft. The pusher block includes a pusher ring adapted to engage the bearing being removed. The exact design of the pusher ring will be varied as needed so the pusher ring will not engage the actual bearing race, but will engage a sturdy portion of the bearing that can withstand the forces involved.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENT

Figure 1:
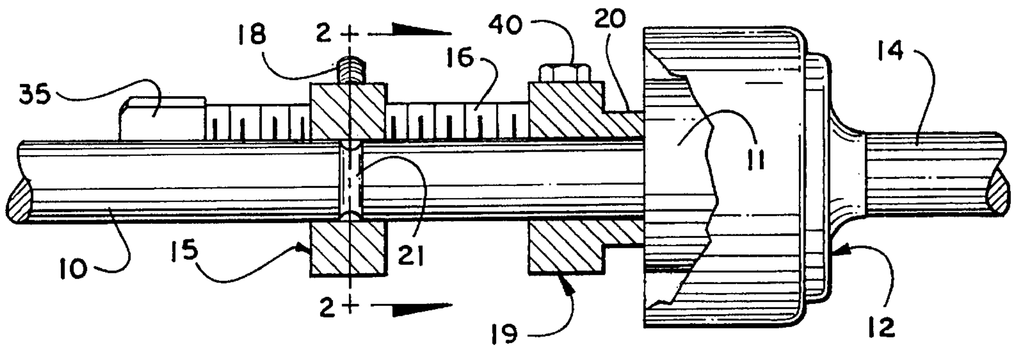
FIG. 1 is a side elevational view showing a shaft having a bearing thereon, and showing a bearing pusher in cross-section mounted on the shaft in position to remove the bearing.

Referring now more particularly to the drawings, and to that embodiment of the invention here chosen by way of illustration, FIG. 1 shows a shaft 10 having a bearing 11 thereon. The specific bearing 11 here shown is the bearing for a front wheel of a front-wheel-drive vehicle. It will therefore be seen that there is an apparatus 12 enclosing the bearing 11, the apparatus 12 including a stub shaft 14 for receiving a wheel. Because of the apparatus 12, it will be observed that the end of the shaft 10 is not available for use of a conventional bearing or gear puller. Conventionally, therefore, the bearing 11 is removed by hammering on the bearing 11 to drive it off the shaft 10.

The device of the present invention is shown in place in FIG. 1 for urging the bearing 11 off the shaft 10. It will be seen that there is an anchor block 15 fixed to the shaft 10, and carrying at least one pushing member 16. There is a locking means 18 for selectively fixing the anchor block 15 to the shaft 10. Adjacent to the anchor block 15 there is a pusher block 19. The pusher block 19 is freely movable along the shaft 10, and includes a pushing ring 20. Those skilled in the art will understand that the pushing ring 20 will engage the bearing 11 in a manner not to damage the bearings. The pushing ring 20 will preferably engage the rigid portion of the bearing that receives the shaft 10, so the force to remove the bearing will be applied directly rather than through the bearing races or the like.

It should be noticed that the shaft 10 defines a groove 21 circumferentially thereof. Those skilled in the art will understand that a rubber boot typically covers the area pictured, and the groove 21 receives one end of the boot so the boot is retained in position. In the embodiment of the invention here shown, the groove 21 is used in conjunction with the locking means 18 to hold the anchor block 15 is the desired position without damaging the shaft 10. This construction will be discussed in more detail below.

Figure 2:
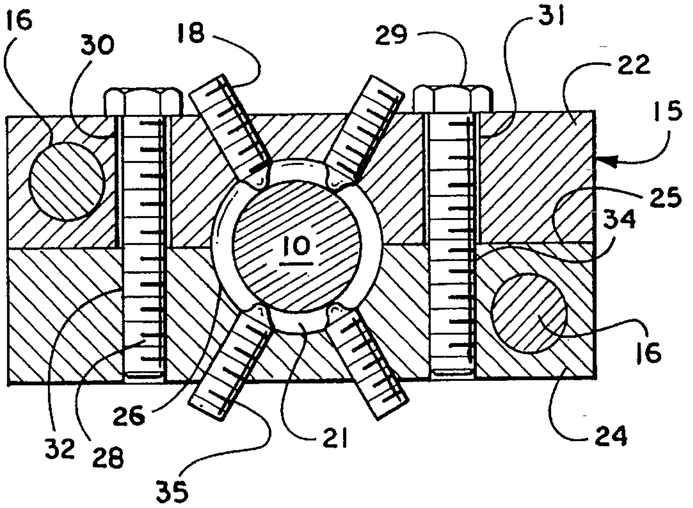
FIG. 2 is a cross-sectional view taken along the line 2—2 in FIG. 1.

Attention is now directed to FIG. 2 of the drawings. In this figure it can be seen that the anchor block 15 comprises an upper member 22 and a lower member 24. The parting line 25 between the upper and lower members 22 and 24 is preferably along a diameter of the opening 26 for receiving the shaft 10. To hold the upper and lower members together, then, there are two screws 28 and 29. The screws 28 and 29 pass through openings 30 and 31 in the upper member 22, and engage threaded holes 32 and 34 in the lower member 24.

As is shown in FIG. 1, the pushing members 16 comprise threaded members having a head 35 for engagement with a wrench or the like. The pushing members 16 are threadedly engaged with the anchor block 15, one being on one side, in the upper member 22, and the other being on the opposite side, in the lower member. Rotation of the heads 35 will therefore cause longitudinal movement of the pushing members 16.

The locking means 18 may take several different forms. It is well known that one might use a conventional cup-pointed set screw or the like to lock the anchor member 15 to the shaft 10. The locking means 18 here illustrated is the preferred embodiment because a natural feature of the shaft 10 is used for securely locking the anchor block 15 to the shaft 10 without marring the surface of the shaft. Thus, the locking means 18 includes four ball-pointed screws 35. The four screws 35 are spaced circumferentially of the opening 26 in an effort to obtain uniform holding of the block 15 and to prevent canting of the block. Those skilled in the art will understand that a different number of screws 35 can be used. As few as one screw will work quite well, and four provides good balance. Virtually any number can be used if properly spaced for adequate holding of the block.

With the above description in mind it will be understood that the screws 28 and 29 can be removed from the anchor block 15, and the upper and lower members 22 and 24 can be separated. The two halves can then be placed on opposite sides of the shaft 10, and the members reassembled using the screws 28 and 29. The opening 26 will be of such a size that the upper and lower members 22 and 24 can be pulled together snugly with the shaft 10 received within the opening 26.

With the anchor block 15 properly placed around the groove 21, the screws 35 will be rotated to move inwardly until the ball points are engaged within the groove 21. Of course, if the shaft 10 does not have the groove 21, a pointed, or cup pointed set screw will be used to hold firmly to the shaft.

Figure 3:
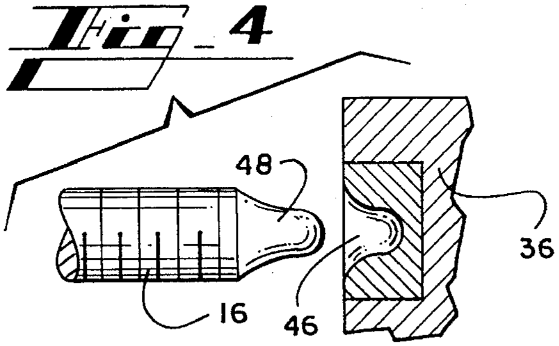
FIG. 3 is an elevational view, partially in cross-section, of the pusher block shown in FIG. 1; and, FIG. 4 is an enlarged, fragmentary view showing the pushing member and its bearing member on the pusher block.

Attention is now directed to FIG. 3 for a full understanding of the pusher block 19. It will be seen that the pusher block also includes an upper member 36 and a lower member 38 which separate along a line 39. The two members are held together by screws 40 and 41. As in the anchor block, the screws 40 and 41 pass through holes 42 in the upper member 36 and engage threaded holes 44 in the lower member 38. The central opening 45 is preferably sized so that, with the upper and lower members 36 and 38 held snugly together, the pusher block 19 will still slide reasonably easily along the shaft 10.

From the above discussion it will be understood that the pushing members 16 engage the pusher block 19 to urge it along the shaft. In view of the forces involved, it is preferable to have sockets in the pusher block 19 to prevent lateral movement of the pushing members 16. Thus, the pusher block 19 includes sockets 46 located to be aligned with the pushing members 16.

Figure 4:
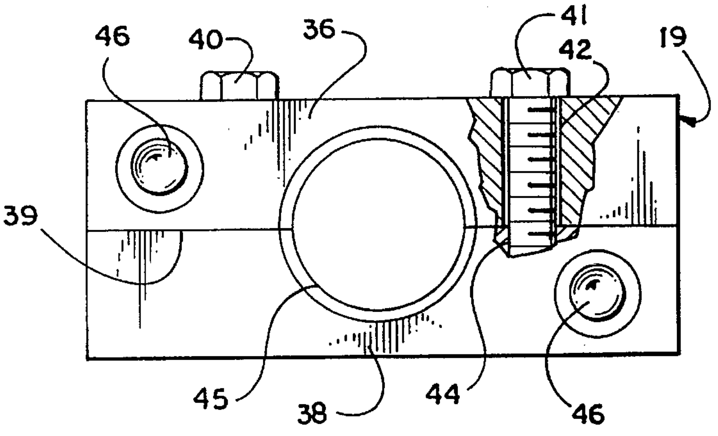

FIG. 4 illustrates the preferred form of the tip of the pushing member 16 and the socket 46. The socket 46 is formed of a bearing material, and may be a separate insert of material. The pushing member 16 is shaped to be easily received within the socket 46, and to rotate therein. This arrangement prevents lateral motion, or walking of the pushing member during use.

It will now be clearly understood that the anchor block 15 will be fixed to the shaft 10, and the pusher block 19 placed on the shaft between the anchor block 15 and the bearing 11. Rotation of the pushing members 16 will cause them to engage the sockets 46 on the pusher block 19. Continued rotation, then, will urge the pusher block against the bearing 11. Further rotation of the pushing members 16 will urge the bearing off the end of the shaft 10.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A bearing pusher for urging a bearing off a shaft, said bearing pusher comprising an anchor block defining an opening therein for receiving said shaft therethrough, locking means for temporarily fixing said anchor block to said shaft adjacent to said bearing, a pusher block defining an opening therein for receiving said shaft therethrough, said pusher block being positioned between said anchor block and said bearing, and pushing means threadedly engaging said anchor block and in contact with said pusher block for urging said pusher block towards said bearing, said anchor block further including an upper member and a lower member defining a parting line therebetween, said parting line being along a diameter of said opening in said anchor block, and means for securing said upper member and said lower member together, and, wherein said shaft defines a circumferential groove, said anchor block being positioned at said groove, and said locking means comprising at least one screw, a tip on said screw being receivable within said groove.

2. A bearing pusher as claimed in claim 1, said pusher block further including an upper member and a lower member defining a parting line therebetween, said parting line being along a diameter of said opening in said pusher block, and means for securing said upper member and said lower member together.

3. A bearing pusher as claimed in claim 2, said pusher block including a pusher ring carried by said pusher block for engaging said bearing.

4. A bearing pusher as claimed in claim 3, said pusher block defining sockets thereon, said sockets being adapted to receive the extending ends of said pushing means.

* * * * *